US012719215B2

(12) United States Patent
Kim et al.

(10) Patent No.: US 12,719,215 B2
(45) Date of Patent: Aug. 25, 2026

(54) CONNECTOR WITH TPA

(71) Applicant: Tyco Electronics AMP Korea Co., Ltd., Gyeongsan (KR)

(72) Inventors: Sung-Chul Kim, Gyeongsan-Si (KR); Byung-Hee Cho, Gyeongsan-Si (KR); Suk-Eun Jung, Gyeongsan-Si (KR); Ki Deok Cheon, Gyeongsan-Si (KR)

(73) Assignee: TYCO ELECTRONICS AMP KOREA CO., LTD., Gyeongsan-si (KR)

( * ) Notice: Subject to any disclaimer, the term of this patent is extended or adjusted under 35 U.S.C. 154(b) by 321 days.

(21) Appl. No.: 18/525,977

(22) Filed: Dec. 1, 2023

(65) Prior Publication Data

US 2024/0186751 A1 Jun. 6, 2024

(30) Foreign Application Priority Data

Dec. 2, 2022 (KR) ........................ 10-2022-0166377
Oct. 25, 2023 (KR) ........................ 10-2023-0143672

(51) Int. Cl.

| | |
|---|---|
| ***H01R 13/641*** | (2006.01) |
| ***H01R 9/24*** | (2006.01) |
| ***H01R 13/502*** | (2006.01) |
| ***H01R 13/629*** | (2006.01) |

(52) U.S. Cl.

CPC ......... *H01R 13/641* (2013.01); *H01R 9/2491* (2013.01); *H01R 13/502* (2013.01); *H01R 13/629* (2013.01)

(58) Field of Classification Search

CPC .. H01R 13/641; H01R 9/2491; H01R 13/502; H01R 13/629; H01R 13/501; H01R 13/4361

See application file for complete search history.

(56) References Cited

U.S. PATENT DOCUMENTS 9,667,002 B1 * 5/2017 Martin ............... H01R 13/4223

FOREIGN PATENT DOCUMENTS

| | | | | |
|---|---|---|---|---|
| EP | 1459411 B1 * | 5/2011 | ........... | H01R 13/506 |
| EP | 4468526 A1 * | 11/2024 | ............. | H01R 43/20 |
| GB | 2422728 A * | 8/2006 | ........... | H01R 13/514 |
| KR | 101540809 B1 * | 7/2015 | ............. | H01R 24/40 |

OTHER PUBLICATIONS

Machine Translation EP 1459411 B1, (dated May 11, 2011) (Year: 2025).*
Machine Translation KR 101540809 B1, (dated Jul. 30, 2015) (Year: 2025).*

* cited by examiner

*Primary Examiner* — Travis S Chambers

(57) ABSTRACT

A connector assembly comprises a body and a position assurance member. The body includes a plurality of terminals and a coupling groove exposing a portion of the plurality of terminals. The position assurance member is formed integrally with the body and is adapted to verify a position of the plurality of terminals when inserted in the coupling groove. The position assurance member includes a hinge portion enabling its rotation around the body, a head, and a reworking groove. The head extends in a cantilever manner from the hinge portion, and defines a locking portion insertable in the coupling groove to be locked and coupled thereto. The reworking groove is formed below or adjacent to the locking portion in the head and enables the position assurance member to be reopened as an opening tool is inserted therein.

18 Claims, 5 Drawing Sheets

CONNECTOR WITH TPA

CROSS-REFERENCE TO RELATED APPLICATIONS

This application claims the priority benefit of Korean Patent Application Nos. 10-2022-0166377 filed on Dec. 2, 2022, and 10-2023-0143672 filed on Oct. 25, 2023, in the Korean Intellectual Property Office, the disclosures of which are incorporated herein by reference for all purposes.

FIELD OF THE INVENTION

The following description relates to a connector assembly having a position assurance member (e.g., a terminal position assurance (TPA) member) and an electronic device including the connector assembly.

BACKGROUND

A connector is a type of electric component that selectively allows or blocks an electrical connection. The connector may include a plurality of terminals. During assembly, however, the terminals may not be completely inserted in a housing of the connector. Likewise, a terminal may escape as a wire connected to the terminal is pulled by vibration generated when the connector is in use. Such an escape or displacement of a terminal may be problematic, resulting in poor connection(s). As a result, a TPA member may be provided to verify whether the terminal is improperly assembled during the assembling of a connector.

SUMMARY

According to an embodiment of the present disclosure, a connector assembly comprises a body and a position assurance member. The body includes a plurality of terminals and a coupling groove exposing a portion of the plurality of terminals. The position assurance member is formed integrally with the body and is adapted to verify a position of the plurality of terminals when inserted in the coupling groove. The position assurance member includes a hinge portion adapted to enable rotation around the body, a head, and a reworking groove. The head extends in a cantilevered shape from the hinge portion, and defines a locking portion insertable into the coupling groove to be locked and coupled thereto. The reworking groove is formed below or adjacent to the locking portion in the head and enables the position assurance member to be reopened as an opening tool is inserted therein.

BRIEF DESCRIPTION OF THE DRAWINGS

The invention will now be described by way of example with reference to the accompanying Figures, of which.

DETAILED DESCRIPTION OF THE EMBODIMENTS

Figure 1:
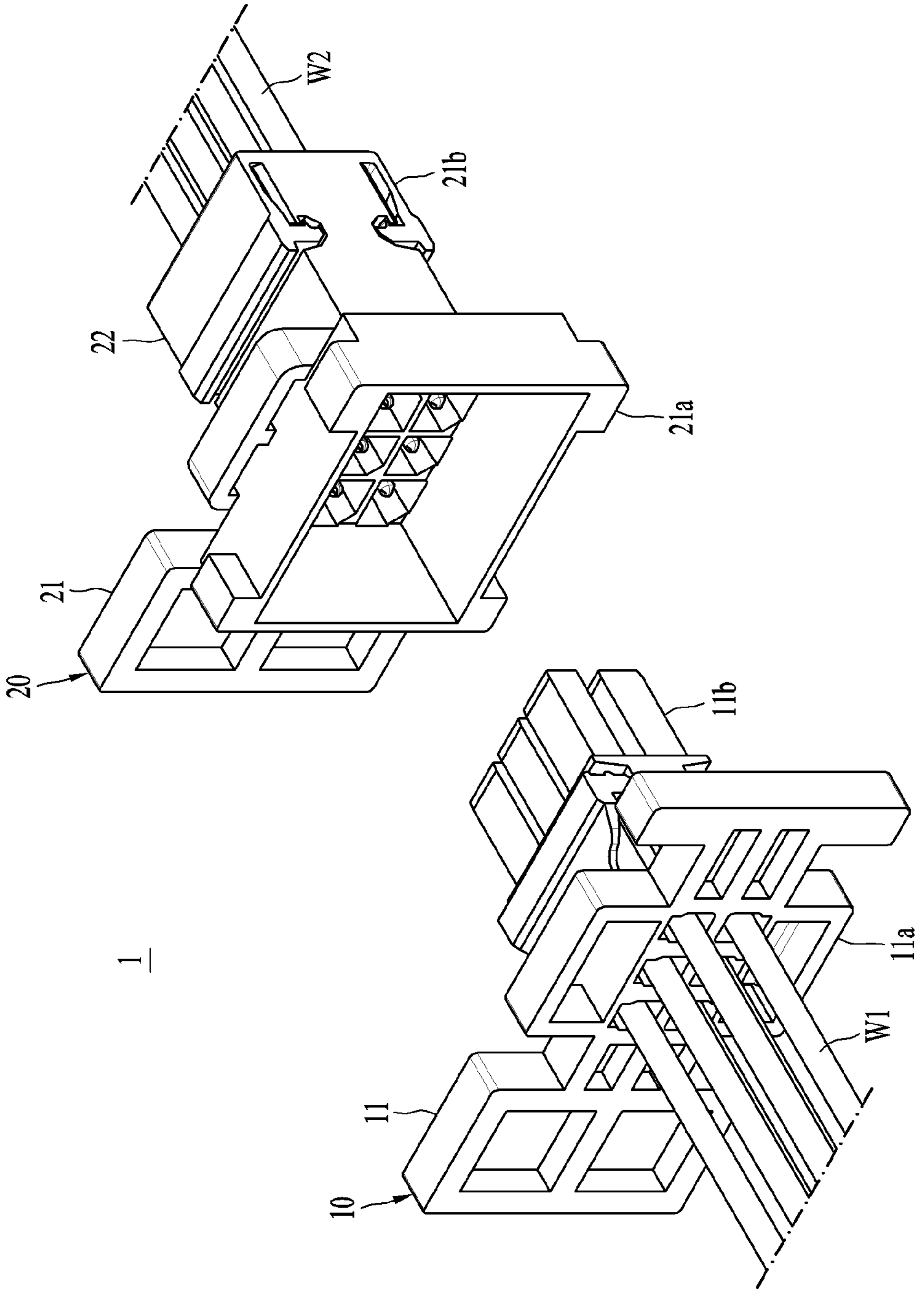
FIG. 1 is a perspective view of a connector assembly according to an example embodiment.

Hereinafter, example embodiments will be described in detail with reference to the accompanying drawings. It should be understood, however, that there is no intent to limit this disclosure to the particular example embodiments disclosed. On the contrary, example embodiments are to cover all modifications, equivalents, and alternatives falling within the scope of the example embodiments.

The terminology used herein is for the purpose of describing particular example embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In the description of example embodiments, detailed description of well-known related structures or functions will be omitted when it is deemed that such description will cause ambiguous interpretation of the present disclosure.

Terms such as first, second, A, B, (a), (b), and the like may be used herein to describe components. Each of these terminologies is not used to define an essence, order, or sequence of a corresponding component but used merely to distinguish the corresponding component from other component(s). It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

Hereinafter, example embodiments will be described in detail with reference to the accompanying drawings. Regarding the reference numerals assigned to the elements in the drawings, it should be noted that the same elements will be designated by the same reference numerals, wherever possible, even though they are shown in different drawings.

Figure 2:
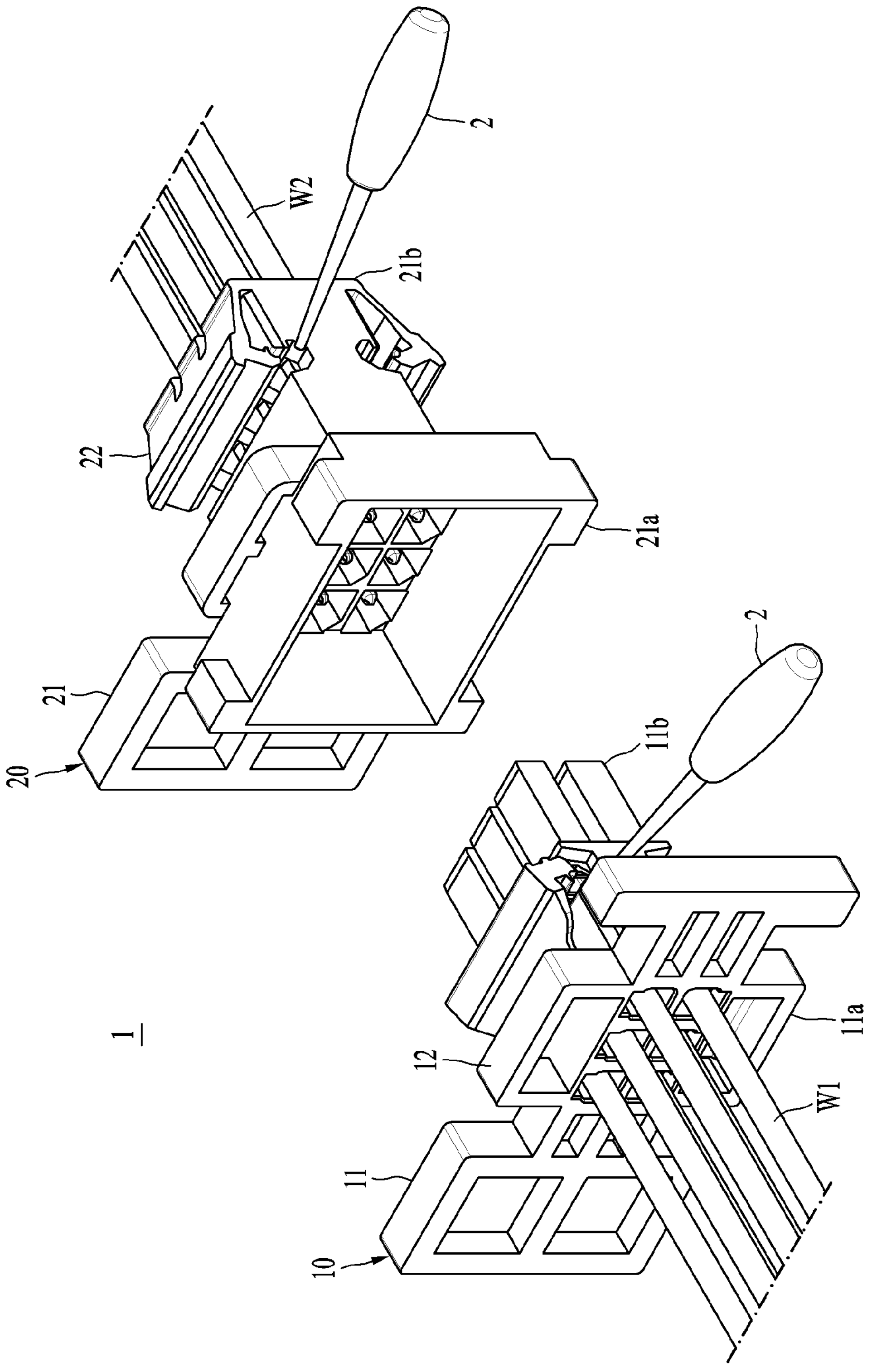
FIG. 2 is a perspective view of the connector assembly of FIG. 1 in which a position assurance member is open.
Figure 3:
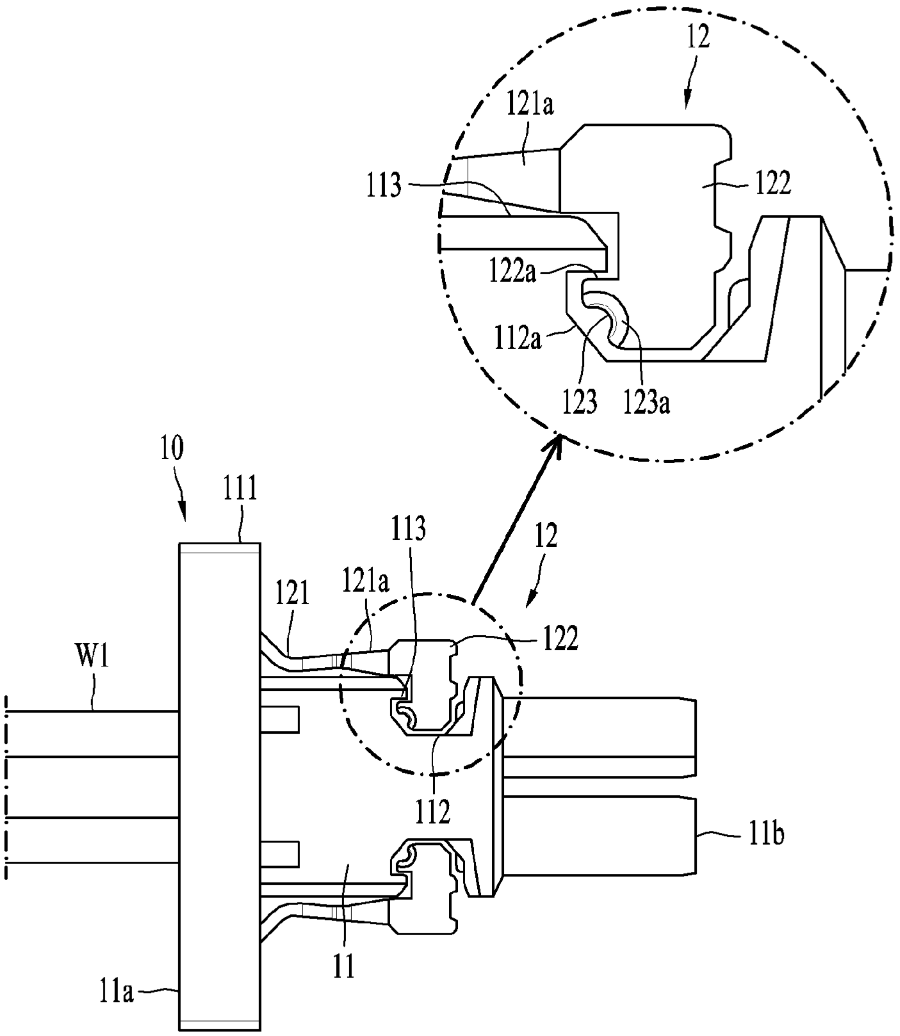
FIG. 3 is a side view of a plug of FIG. 1.
Figure 4:
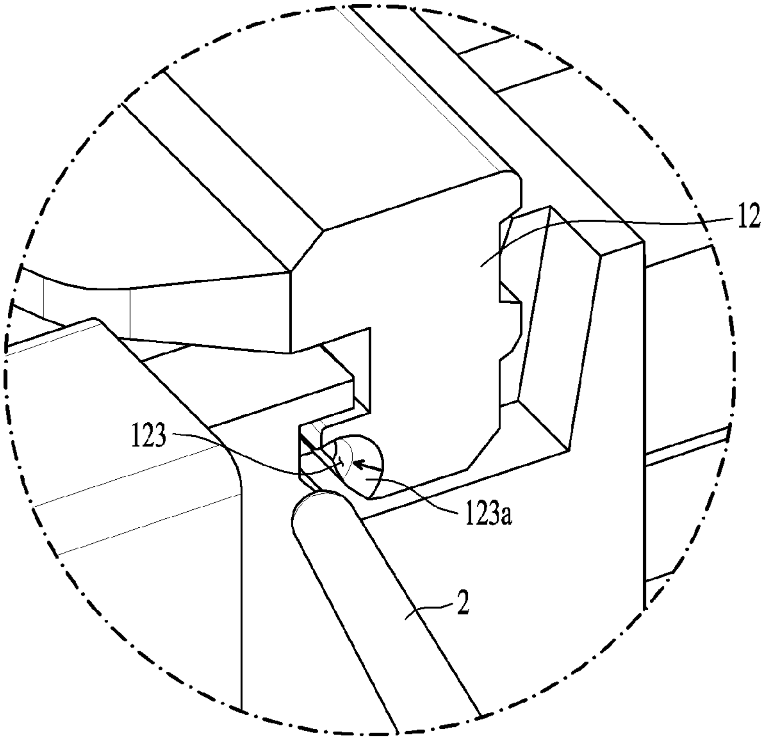
FIG. 4 is an enlarged view illustrating a reopening operation of a position assurance member of FIG. 3.
Figure 5:
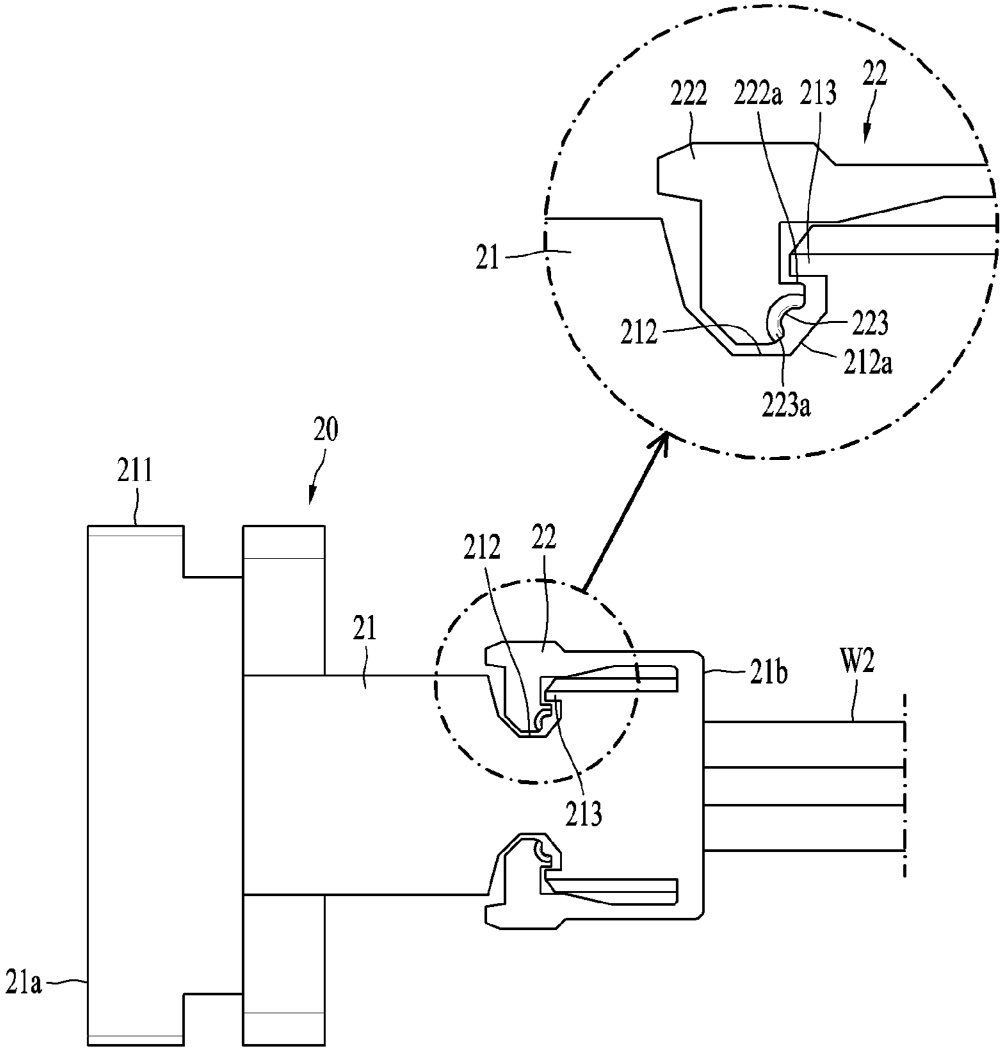
FIG. 5 is a side view of a cap of FIG. 1.

Hereinafter, a connector assembly 1 of example embodiments of the present disclosure will be described with reference to FIGS. 1-5. The connector assembly 1 may include a plug 10 and a cap 20 that are adapted to be coupled to each other and have a plurality of terminals. The plug 10 may include a plug body 11 that accommodates a plurality of first terminals (hereinafter referred to as receptacle terminals T1). The cap 20 may include a cap housing 21 that accommodates a plurality of second terminals (hereinafter referred to as tab terminals T2). The cap housing 21 may be coupled to the plug 10 as the plug 10 is inserted therein. When the plug 10 and the cap 20 are coupled to each other, the plurality of receptacle terminals T1 and the plurality of tab terminals T2 may be electrically connected by being matched one to one respectively.

In the following description, an end of the plug body 11 into which the plurality of receptacle terminals T1 is to be inserted will be referred to as a first end 11*a*, and an end of the plug body 11 that is opposite to the first end 11*a* and is to be coupled to the cap housing 21 will be referred to as a second end 11*b*. In addition, an end of the cap housing 21 to which the plug 10 is to be coupled will be referred to as a first end 21*a*, and an end of the cap housing 21 that is opposite to the first end 21*a*, into which the plurality of tab terminals T2 is to be inserted, will be referred to as a second end 21*b*. In addition, in the following description, up-down/left-right/front-back directions of the plug 10 and the cap 20 will be described based on a state shown in FIG. 1. That is, a direction of the first ends 11*a* and 21*a* of the plug 10 and the cap 20 will be referred to as the front or a forward direction, and a direction of the second ends 11*b* and 21*b* of the plug 10 and the cap 20 will be referred to as the back or a backward direction. In addition, a direction from the front to the back of the plug 10 and the cap 20 will be referred to as a longitudinal direction or a length direction, and a direction perpendicular to the longitudinal direction (i.e., a front-back direction in the drawings) will be referred to as a width direction.

In the drawings, W1 and W2 indicate wires W1 and W2 coupled to a receptacle terminal T1 and a tab terminal T2, respectively. The plug 10 and the cap 20 may include position assurance members (or terminal position assurance (TPA) members) 12, 22 to check or verify whether the terminals T1 and T2 are installed at their respective correct positions.

Hereinafter, the plug 10 and the position assurance member (hereinafter referred to as a first TPA member 12) will be described. The plug body 11 may have a coupling groove 112 that is formed to expose a portion of the plurality of receptacle terminals T1. For example, the plug body 11 may have coupling grooves 112 formed on its upper and lower surfaces to be symmetrical to each other. Although the coupling grooves 112 are shown in the drawings as formed on the upper and lower surfaces of the plug body 11, this is provided only for the convenience of description, and the coupling groove 112 may be formed on one of the upper and lower surfaces of the plug body 11 or be formed on a side surface of the plug body 11. In addition, in the following description, the coupling groove 112 and the first TPA member 12 may have shapes symmetrical to each other, and the description thereof will thus be provided based on the coupling groove 112 and the first TPA member 12 that are positioned on an upper portion of the plug body 11, and the same description will apply to the coupling groove 112 and the first TPA member 12 that are positioned on a lower portion of the plug body 11.

The coupling groove 112 may have a locking bump 113 to which the first TPA member 12 is to be locked and coupled. In this case, the locking bump 113 may be formed at an upper edge of the coupling groove 112. The locking bump 113 may protrude in a direction opposite to a direction in which the first TPA member 12 is to be coupled, i.e., a direction opposite to a hinge portion 121 of the first TPA member 12.

The first TPA member 12 may be formed integrally and monolithically with the plug body 11. The first TPA member 12 may have the hinge portion 121 formed as one end thereof and fixed to the plug body 11 to be hinged and rotatable and have a head 122 formed as the other end thereof extends in a cantilever shape toward the second end 11*b* from the hinge portion 121 to have the head 122 at its end. In this case, the first TPA member 12 may be formed such that a movable part 121*a* between the hinge portion 121 and the head 122 has its own elasticity, and may be provided by being inclined at an angle with respect to the plug body 11.

The hinge portion 121 may be fixed to the first end 11*a* of the plug body 11 and, for example, may be fixed to a partition wall 111. In this case, the plug body 11 may have the partition wall 111 that extends perpendicularly and outwardly with respect to the plug body 11 from the first end 11*a*. When the plug 10 and the cap 20 are coupled to each other, the partition wall 111 may be formed to protrude further outward than the cap housing 21 while they are in a coupled state. A portion of the partition wall 111 connected to the hinge portion 121 of the first TPA member 12 may be cut to form a predetermined rip. According to this example embodiment, the rip or tear may be formed with the hinge portion 121 being fixed to the partition wall 111, which may allow the first TPA member 12 to be elastically deformed more flexibly. However, the first TPA member 12 may be formed such that the hinge portion 121 extends from the partition wall 111 without the rip formed on the partition wall 111.

The head 122 is adapted to be insertable into the coupling groove 112. The head 122 may have a locking portion 122*a* that is adapted to be locked and coupled to the locking bump 113 inside the coupling groove 112. For example, the locking portion 122*a* may be formed to protrude toward the locking bump 113, i.e., toward the hinge portion 121.

The first TPA member 12 may be inclined such that a distance from a surface of the plug body 11 increases from the hinge portion 121 to the head 122. According to this embodiment, the first TPA member 12 may be provided to be inclined with respect to the plug body 11, and thus when the head 122 is pressed, the head 122 may be hinged and rotated by the hinge portion 121 to move to a position at which it is to be inserted into the coupling groove 112. In addition, the movable part 121*a* of the first TPA member 12 may have elasticity, and thus when the first TPA member 12 is pressed, the head 122 may flexibly ride along the locking bump 113 by the movable part 121*a* to be inserted into the coupling groove 112. Such a state may be referred to herein as a locked state or closed state of the first TPA member 12. In the locked state, the first TPA member 12 may be fixed as the locking portion 122*a* applies a force to the locking bump 113 by an elastic resilience by the movable part 121*a* while the locking portion 122*a* is engaged with the locking bump 113, which may prevent the locking of the first TPA member 12 from being released.

When the head 122 is inserted in the coupling groove 112, the first TPA member 12 may contact the receptacle terminal T1 inside the coupling groove 112. Accordingly, when the receptacle terminal T1 is installed at a correct position of the plug body 11, the head 122 may be completely inserted in the coupling groove 112 and the first TPA member 12 may thus be completely closed. However, in a case in which the receptacle terminal T1 is installed upside down or not at the correct position, there may be interference with the receptacle terminal T1 inside the coupling groove 112, and the head 122 may not be completely inserted in the coupling groove 112. Therefore, the first TPA member 22 may verify or indicate whether the receptacle terminal T1 is installed at the correct position based on whether the head 122 is completely inserted in the coupling groove 112 during a closing operation. In addition, when the head 122 is inserted in the coupling groove 112, the head 122 may be pressed to contact the receptacle terminal T1, and in this case, may press the receptacle terminal T1 in a direction opposite to a direction in which the receptacle terminal T1 escapes from the plug body 11. Accordingly, in a case in which the receptacle terminal T1 is not installed at the correct position of the plug body 11, when the first TPA member 12 is closed, the head 122 may press the receptacle terminal T1 inside the coupling groove 112 to push the receptacle terminal T1 to the correct position. This may prevent the escape from the correct position while maintaining it at the correct position.

The first TPA member 12 may also have a reworking groove 123 that allows the first TPA member 12 in the locked state to be reopened when there is a need to reoperate the receptacle terminal T1. The reworking groove 123 may be formed below the locking portion 122*a* and may be formed in a semi-cylindrical shape such that an opening tool 2 (e.g., a commercially available awl) is to be inserted therein. In addition, the reworking groove 123 may be formed such that, when the opening tool 2 is inserted, a force applied by the opening tool 2 acts in a direction in which the locking portion 122*a* escapes from the locking bump 113. More specifically, the reworking groove 123 may be formed to be concave with respect to an inclined surface that is formed by chamfering a lower edge of the locking portion 122*a* in the head 122, and may be formed in a cylindrical shape along a width direction of the plug body 11. According to this embodiment, when the opening tool 2 is inserted in the reworking groove 123, a force may be applied backward and upward (hereinafter, a "diagonal direction") to the head 122 according to a curved direction of the reworking groove 123, and the locking portion 122*a* may escape from the locking bump 113, which may allow the first TPA member 12 to be reopened.

In addition, according to this embodiment, to facilitate the reopening of the first TPA member 12, a portion corresponding to the reworking groove 123 inside the coupling groove 112 may be formed as an inclined surface (see 123*a*) corresponding to an inclination angle of the reworking groove 123. In addition, a chamfer portion 123*a* may be formed at both ends of the reworking groove 123, i.e., around a portion corresponding to a side surface of the plug body 11. The chamfer portion 123*a* may be formed to be inclined with respect to a direction in which the opening tool 2 enters the reworking groove 123 from a side surface of the head 122. According to this embodiment, the chamfer portion 123*a* may be formed at an end portion of the reworking groove 123, and the opening tool 2 may thus be smoothly inserted into the reworking groove 123.

Hereinafter, the cap 20 and the position assurance member (hereinafter referred to as a second TPA member 22) will be described. The cap 20 has substantially the same structure as the plug 10, and thus the same components in the cap 20 and the second TPA member 22 as the ones in the plug 10 and the first TPA member 12 will be referred to as the same names only with different corresponding reference numerals being with a "2" vs. a "1". The cap 20 may include the cap housing 21 that accommodates a plurality of tab terminals T2 and has a coupling groove 212, and a second TPA member 22 that is integrally formed with the cap housing 21 and to be inserted into and fixed to the coupling groove 212.

The second TPA member 22 may have a hinge portion formed as one end thereof and fixed to the second end 21*b* of the cap housing 21 to be hinged and rotatable, and a head 222 formed as the other end thereof extends in a cantilever shape toward a first end 21*a* from the hinge portion 221 to have the head 222 at its end into which the coupling groove 212 is to be inserted. The second TPA member 22 may be formed to be inclined such that a distance from a surface of the cap housing 21 increases from the hinge portion 221 to the head 222. In addition, the second TPA member 22 may be formed such that the hinge portion 221 is connected to the cap housing 21 at a lower surface of the second TPA member 22, and may thus be formed such that a portion adjacent to the hinge portion 221 is distanced from the cap housing 21 by a predetermined height. According to this embodiment, the shape of the hinge portion 221 may prevent the hinge portion 221 from protruding further than the second TPA member 22 when the second TPA member 22 is completely closed.

The second TPA member 22 may have a reworking groove 223 having a semi-cylindrical shape formed at a lower edge of a locking portion 222*a* of the head 222. The reworking groove 223 may be formed such that, when an opening tool 2 is inserted, a force applied by the opening tool 2 acts in a direction in which the locking portion 222*a* escapes from a locking bump 213 (i.e., a diagonal direction forward and upward). In addition, a chamfer portion 223*a* inclined in a direction in which the opening tool 2 enters may be formed around the reworking groove 223.

According to the embodiments of the present disclosure described herein, a TPA member (e.g., 12 and 22) may have a reworking groove (e.g., 123 and 223) and may thus be readily reopened by the insertion of an opening tool (e.g., 2).

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A connector assembly, comprising:

a body having a plurality of terminals and a coupling groove exposing a portion of the plurality of terminals; and a position assurance member formed integrally with the body and adapted to verify a position of the plurality of terminals when inserted in the coupling groove, the position assurance member including:

a hinge portion coupled to the body on an end of the position assurance member and enabling a hinged rotation of the position assurance member around the body;

a head formed as another end of the position assurance member and extending in a cantilever shape from the hinge portion, the head defining a locking portion insertable into the coupling groove and adapted to be locked and coupled thereto; and a reworking groove formed below the locking portion in the head and enabling the position assurance member to be reopened as an opening tool is inserted therein, a portion corresponding to the reworking groove inside the coupling groove defines an inclined surface corresponding to an inclination of the reworking groove.

2. The connector assembly of claim 1, wherein the reworking groove is concave with respect to an inclined surface formed by a chamfered lower edge of the locking portion.

3. The connector assembly of claim 2, wherein the reworking groove defines a cylindrical shape.

4. The connector assembly of claim 2, wherein the reworking groove has a chamfer portion inclined with respect to a direction of insertion of the opening tool into the reworking groove.

5. The connector assembly of claim 1, wherein the position assurance member is inclined relative to the body such that a distance from a surface of the body increases from the hinge portion toward the head.

6. The connector assembly of claim 1, wherein:

the coupling groove has a locking bump protruding in a direction opposite to the hinge portion of the position assurance member from an upper edge thereof, and the locking portion protrudes toward the hinge portion so as to be locked and coupled to the locking bump.

7. The connector assembly of claim 1, wherein:

the coupling groove is defined on upper and lower surfaces of the body, and the position assurance member is symmetrically provided in upper and lower portions of the body.

8. A connector assembly, comprising:

a plug including a plurality of first terminals and a coupling groove exposing a portion of the plurality of first terminals;

a cap including a plurality of second terminals and a coupling groove exposing a portion of the plurality of second terminals, into which the plug is to be inserted;

a first position assurance member integrally formed with the plug and adapted to verify a position of the plurality of first terminals; and a second position assurance member integrally formed with the cap and adapted to verify a position of the plurality of second terminals, each of the first and second position assurance members including:

a hinge portion coupled to the plug or the cap on an end of the position assurance member and enabling a hinged rotation of the position assurance member around the plug or the cap;

a head formed as another end of the position assurance member and extending in a cantilever shape from the hinge portion, the head defining a locking portion insertable into the coupling groove of the plug or the cap and adapted to be locked and coupled thereto; and a reworking groove formed below the locking portion in the head and enabling the position assurance member to be reopened as an opening tool is inserted therein, the plug and the cap each have a portion corresponding to the reworking groove inside the coupling groove, the portion defining an inclined surface corresponding to an inclination of the reworking groove.

9. The connector assembly of claim 8, wherein:

the plug has a partition wall that outwardly extends at a first end into which the plurality of first terminals is to be inserted, and the first position assurance member has the hinge portion to be coupled to the partition wall.

10. The connector assembly of claim 9, wherein the partition wall has a rip portion coupled to the hinge portion.

11. The connector assembly of claim 8, wherein the cap defines a first end into which the plug is to be inserted and a second end into which the plurality of second terminals is to be inserted, and the second position assurance member has the hinge portion to be coupled to the second end.

12. The connector assembly of claim 8, wherein the reworking groove is concave in a cylindrical shape along a width direction of the plug and the cap such that an opening tool is insertable from the outside of the plug and the cap.

13. The connector assembly of claim 12, wherein the first position assurance member and the second position assurance member are each concave with respect to an inclined surface formed as an edge below the locking portion.

14. The connector assembly of claim 12, wherein the reworking groove has a chamfer portion formed around the reworking groove and inclined with respect to a direction in which the opening tool is adapted to enter from side surfaces of the plug and the cap.

15. A connector assembly, comprising:

a body defining a plurality of terminal openings and a coupling groove exposing a portion of the plurality of terminal openings; and a position assurance member formed integrally with the body, including:

a hinge portion rotatably connecting the position assurance member to the body;

a head extending from the hinged portion and defining a locking portion insertable into the coupling groove; and a reworking groove formed adjacent the locking portion in the head and adapted to receive a tool for reopening the position assurance member, a portion corresponding to the reworking groove inside the coupling groove defines an inclined surface corresponding to an inclination of the reworking groove.

16. The connector assembly of claim 15, wherein at least a portion of the reworking groove is concave with respect to an inclined surface formed by a chamfered lower edge of the locking portion.

17. The connector assembly of claim 15, wherein the reworking groove has a chamfered portion inclined with respect to a direction of insertion of the tool into the reworking groove.

18. A connector assembly, comprising:

a body having a plurality of terminals and a coupling groove exposing a portion of the plurality of terminals, the coupling groove is defined on upper and lower surfaces of the body; and a position assurance member formed integrally with the body and adapted to verify a position of the plurality of terminals when inserted in the coupling groove, the position assurance member is symmetrically provided in upper and lower portions of the body, the position assurance member including:

a hinge portion coupled to the body on an end of the position assurance member and enabling a hinged rotation of the position assurance member around the body;

a head formed as another end of the position assurance member and extending in a cantilever shape from the hinge portion, the head defining a locking portion insertable into the coupling groove and adapted to be locked and coupled thereto; and a reworking groove formed below the locking portion in the head and enabling the position assurance member to be reopened as an opening tool is inserted therein.

* * * * *